US012668455B2

(12) United States Patent
Hiltunen et al.

(10) Patent No.: US 12,668,455 B2
(45) Date of Patent: Jun. 30, 2026

(54) INTERFACE DEVICE, AN ELEVATOR SYSTEM, AND A METHOD FOR CONTROLLING DISPLAYING OF A DESTINATION CALL

(71) Applicant: KONE Corporation, Helsinki (FI)

(72) Inventors: Jussi Hiltunen, Helsinki (FI); Reetta Ranne, Helsinki (FI); Claus Ingman, Helsinki (FI); Tuukka Muroke, Helsinki (FI); Timo Saarnio, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1423 days.

(21) Appl. No.: 17/215,930

(22) Filed: Mar. 29, 2021

(65) Prior Publication Data

US 2021/0214186 A1 Jul. 15, 2021

Related U.S. Application Data

(63) Continuation of application No. PCT/FI2018/050748, filed on Oct. 16, 2018.

(51) Int. Cl.
*B66B 1/46* (2006.01)
*B66B 3/00* (2006.01)

(52) U.S. Cl.
CPC .............. *B66B 1/468* (2013.01); *B66B 3/006* (2013.01); *B66B 2201/103* (2013.01); *B66B 2201/4615* (2013.01)

(58) Field of Classification Search
CPC ... B66B 1/468; B66B 3/006; B66B 2201/103; B66B 2201/4615
USPC .......................................................... 187/380
See application file for complete search history.

(56) References Cited

U.S. PATENT DOCUMENTS 4,042,067 A * 8/1977 Mandel ................... B66B 1/468 187/380
6,202,799 B1 * 3/2001 Drop ..................... B66B 1/2408 187/391
6,216,172 B1 * 4/2001 Kolblin ............... H04L 61/5038 709/227

(Continued)

FOREIGN PATENT DOCUMENTS

CN 1973382 A 5/2007
CN 103647782 B * 2/2017

(Continued)

OTHER PUBLICATIONS

Chinese Office Action for corresponding Chinese Application No. 201880098723.6, dated Apr. 26, 2023, with English translation.

(Continued)

*Primary Examiner* — Christina M Schreiber
(74) *Attorney, Agent, or Firm* — Birch, Stewart, Kolasch & Birch, LLP

(57) ABSTRACT

An interface device for controlling displaying of a destination call includes an input configured to receive input information comprising a passenger ID, a controller entity, configured to retrieve the destination call corresponding to the passenger ID, and at least one display configured to display the retrieved destination call. An elevator system and a method for controlling displaying of a destination call include the interface device.

20 Claims, 4 Drawing Sheets

(56) References Cited

U.S. PATENT DOCUMENTS

| | | | | |
|---|---|---|---|---|
| 7,404,469 | B2 * | 7/2008 | Takeuchi | B66B 1/468 187/391 |
| 8,662,256 | B2 * | 3/2014 | Asano | B66B 1/2458 187/391 |
| 8,891,423 | B2 * | 11/2014 | Shaheen | H04W 4/70 370/395.2 |
| 9,284,158 | B2 * | 3/2016 | Sarjanen | B66B 1/468 |
| 9,537,808 | B1 * | 1/2017 | Giansiracusa | H04L 51/18 |
| 10,046,947 | B2 * | 8/2018 | Haipus | B66B 1/3415 |
| 10,875,742 | B2 * | 12/2020 | Scoville | B66B 1/468 |
| 11,884,508 | B2 * | 1/2024 | Kuusinen | B66B 1/468 |
| 11,939,186 | B2 * | 3/2024 | Li | H04L 67/141 |
| 2005/0098391 | A1 * | 5/2005 | Rintala | B66B 1/20 187/396 |
| 2007/0080027 | A1 * | 4/2007 | De Jong | B66B 1/2458 187/383 |
| 2008/0217112 | A1 * | 9/2008 | Puskala | B66B 1/468 187/392 |
| 2009/0022131 | A1 * | 1/2009 | Rusanen | B66B 1/468 370/338 |
| 2009/0294221 | A1 * | 12/2009 | Bahjat | B66B 1/468 187/396 |
| 2012/0066356 | A1 * | 3/2012 | Nguyen | H04L 61/5092 709/220 |
| 2012/0145487 | A1 * | 6/2012 | Yoo | B66B 1/3453 187/380 |
| 2012/0305339 | A1 * | 12/2012 | Korhonen | G07C 9/27 187/380 |
| 2014/0045479 | A1 * | 2/2014 | Shinada | H04W 52/283 455/418 |
| 2014/0131142 | A1 * | 5/2014 | Parkkinen | B66B 1/468 187/382 |
| 2014/0231185 | A1 * | 8/2014 | Salmikuukka | B66B 1/2458 187/384 |
| 2015/0166302 | A1 * | 6/2015 | Parkkinen | B66B 1/2458 187/380 |
| 2015/0183618 | A1 * | 7/2015 | Kondo | B66B 1/468 187/247 |
| 2015/0246790 | A1 * | 9/2015 | Hiltunen | B66B 1/2408 187/382 |
| 2015/0291388 | A1 * | 10/2015 | Hovi | B66B 1/3492 187/387 |
| 2016/0016755 | A1 * | 1/2016 | Hanninen | B66B 1/468 187/382 |
| 2016/0031675 | A1 * | 2/2016 | Silvennoinen | B66B 1/468 700/275 |
| 2016/0031676 | A1 * | 2/2016 | Haipus | B66B 1/468 187/382 |
| 2016/0083218 | A1 * | 3/2016 | Vuorenala | B66B 3/006 187/383 |
| 2016/0251198 | A1 * | 9/2016 | Salmikuukka | B66B 1/2458 187/388 |
| 2016/0272461 | A1 * | 9/2016 | Wienholz-Buß | B66B 1/468 |
| 2016/0337181 | A1 * | 11/2016 | Cathrow | H04L 63/123 |
| 2016/0347577 | A1 * | 12/2016 | Simcik | B66B 1/3407 |
| 2016/0368733 | A1 * | 12/2016 | Chapman | B66B 1/2408 |
| 2016/0376122 | A1 * | 12/2016 | Van Dijk | B66B 1/3476 187/247 |
| 2018/0016116 | A1 * | 1/2018 | Hiltunen | B66B 3/002 |
| 2018/0099840 | A1 * | 4/2018 | Armistead | G05B 19/042 |
| 2018/0118510 | A1 * | 5/2018 | Simcik | G06F 3/0484 |
| 2018/0118511 | A1 * | 5/2018 | Baldi | G06F 3/0485 |
| 2018/0118512 | A1 * | 5/2018 | Baldi | B66B 1/468 |
| 2018/0121072 | A1 * | 5/2018 | Baldi | B66B 1/468 |
| 2018/0282113 | A1 * | 10/2018 | Simcik | G06F 3/0488 |
| 2018/0282115 | A1 * | 10/2018 | Baldi | G06F 3/0482 |
| 2019/0127178 | A1 * | 5/2019 | Tsuji | B66B 1/34 |
| 2021/0214185 | A1 * | 7/2021 | Hiltunen | B66B 3/006 |
| 2021/0214186 | A1 * | 7/2021 | Hiltunen | B66B 1/468 |
| 2021/0300723 | A1 * | 9/2021 | Friedli | B66B 1/468 |
| 2023/0294959 | A1 * | 9/2023 | Pamanes | B66B 1/3461 187/380 |

FOREIGN PATENT DOCUMENTS

| | | | | |
|---|---|---|---|---|
| CN | 108002157 | A | 5/2018 | |
| EP | 2258649 | A1 * | 12/2010 | B66B 1/468 |
| EP | 2587725 | A1 * | 5/2013 | H04L 67/125 |
| EP | 3062541 | A1 * | 8/2016 | H04L 67/12 |
| EP | 3318523 | A1 * | 5/2018 | B66B 3/002 |
| EP | 3381851 | A2 * | 10/2018 | B66B 3/02 |
| EP | 3381852 | A2 * | 10/2018 | B66B 1/468 |
| JP | 6194070 | B1 | 9/2017 | |
| JP | 2018-2376 | A | 1/2018 | |
| WO | WO 2006/011876 | A1 | 2/2006 | |
| WO | WO-2007061405 | A2 * | 5/2007 | B66B 1/468 |
| WO | WO-2007093665 | A1 * | 8/2007 | B66B 1/468 |
| WO | WO-2009127611 | A1 * | 10/2009 | B66B 1/468 |
| WO | WO-2010087815 | A1 * | 8/2010 | B66B 1/3446 |
| WO | WO-2012118711 | A2 * | 9/2012 | H04W 4/70 |
| WO | WO-2014122357 | A1 * | 8/2014 | B66B 1/468 |
| WO | WO-2015084396 | A1 * | 6/2015 | B66B 1/468 |
| WO | WO-2015177020 | A1 * | 11/2015 | H04W 4/00 |
| WO | WO-2018050654 | A1 * | 3/2018 | B66B 1/463 |

OTHER PUBLICATIONS

English Translation of Chinese Office Action and Search Report for Chinese Application No. 201880098723.6, dated Jul. 19, 2022.

Cisco, "Connected Rail Solution Design Guide," URL: https://www.cisco.com/c/dam/en_us/solutions/industries/docs/cts-dg.pdf, Nov. 2016, XP055613499, 42 pages total.

Cisco, "Understanding CHAP authentication," URL: https://www.cisco.com/c/en/us/support/docs/wan/point-to-point-protocol-ppp/25647-understanding-ppp-chap.pdf, Oct. 21, 2015, XP055600402, 10 pages total.

International Search Report for International Application No. PCT/EP2018/078149, dated Mar. 28, 2019.

International Search Report for International Application No. PCT/FI2018/050742, dated Jul. 18, 2019.

International Search Report for International Application No. PCT/FI2018/050743, dated Jul. 5, 2019.

International Search Report for International Application No. PCT/FI2018/050744, dated Sep. 4, 2019.

International Search Report for International Application No. PCT/FI2018/050745, dated Jul. 8, 2019.

International Search Report for International Application No. PCT/FI2018/050746, dated Sep. 24, 2019.

International Search Report for International Application No. PCT/FI2018/050747, dated Jul. 8, 2019.

International Search Report for International Application No. PCT/FI2018/050748, dated Jul. 5, 2019.

Written Opinion of the International Searching Authority for International Application No. PCT/EP2018/078149, dated Mar. 28, 2019.

Written Opinion of the International Searching Authority for International Application No. PCT/FI2018/050742, dated Jul. 18, 2019.

Written Opinion of the International Searching Authority for International Application No. PCT/FI2018/050743, dated Jul. 5, 2019.

Written Opinion of the International Searching Authority for International Application No. PCT/FI2018/050744, dated Sep. 4, 2019.

Written Opinion of the International Searching Authority for International Application No. PCT/FI2018/050745, dated Jul. 8, 2019.

Written Opinion of the International Searching Authority for International Application No. PCT/FI2018/050746, dated Sep. 24, 2019.

Written Opinion of the International Searching Authority for International Application No. PCT/FI2018/050747, dated Jul. 8, 2019.

Written Opinion of the International Searching Authority for International Application No. PCT/FI2018/050748, dated Jul. 5, 2019.

U.S. Appl. No. 17/205,477, filed Mar. 18, 2021.

U.S. Appl. No. 17/205,500, filed Mar. 18, 2021.

U.S. Appl. No. 17/205,572, filed Mar. 18, 2021.

U.S. Appl. No. 17/215,772, filed Mar. 29, 2021.

U.S. Appl. No. 17/215,549, filed Mar. 29, 2021.

U.S. Appl. No. 17/217,202, filed Mar. 30, 2021.

U.S. Appl. No. 17/217,272, filed Mar. 30, 2021.

* cited by examiner

INTERFACE DEVICE, AN ELEVATOR SYSTEM, AND A METHOD FOR CONTROLLING DISPLAYING OF A DESTINATION CALL

CROSS REFERENCE TO RELATED APPLICATIONS

This application is a Continuation of PCT International Application No. PCT/FI2018/050748, filed on Oct. 16, 2018, which is hereby expressly incorporated by reference into the present application.

TECHNICAL FIELD

The invention concerns in general the technical field of elevators. Especially the invention concerns destination calls of elevators.

BACKGROUND

Typically, an elevator system comprises an interface device, e.g. a destination operation panel (DOP) for providing a destination call to a desired destination floor, which may be predefined or manually chosen. Often each destination call may have a passenger specific ID associated to it. The passenger may show an access device, such as an access card, ID card or similar device, to the interface device in order to provide a destination call to the desired destination floor. Alternatively, the destination call to the desired destination floor may be provided with any other device capable for providing the destination call, such as turnstile or mobile device.

The elevator allocated for the destination call may be displayed on a display of the interface device immediately after generation of the destination call during a predefined time, such as 2 to 5 seconds. Alternatively, if the destination call is provided with a turnstile or a mobile device, the elevator allocated for the destination call may be displayed on a display of the turnstile or the mobile device.

The passengers may forget or otherwise miss the elevator allocated for the destination call. Especially when there are no screens from which the passengers may see the made calls, the passengers cannot see the elevator allocated for the destination call. Thus, the passengers typically make new destination calls, go to whichever elevator that might go to the destination floor or go to whichever elevator and make a new call, each of these reduces the optimization of the system and creates unnecessary additional calls jamming destination control system, especially during rush hours.

Hence, there is need to develop further solutions in order to improve the efficiency of an elevator system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, an interface device, and an elevator system for controlling displaying of an destination call information. Another objective of the invention is that the method, the interface device, and the elevator system for controlling displaying of an destination call information improve at least partly the efficiency of an elevator system.

The objectives of the invention are reached by a method, an interface device, and an elevator system as defined by the respective independent claims.

According to a first aspect, an interface device for controlling displaying of a destination call is provided, the device comprises: input means configured to receive input information comprising a passenger ID, a controller entity configured to retrieve the destination call corresponding to the passenger ID, and at least one display configured to display the retrieved destination call.

The interface device may be a destination operation panel, DOP.

The input means may comprise at least one of the following: a card reader, RFID reader, QR code reader, a facial recognition camera, keypad, touch screen.

The at least one display may be configured to display the destination call during a predetermined time.

The displayed destination call may comprise a destination floor.

Furthermore, the displayed destination call may further comprise an elevator ID of the elevator currently allocated to the destination call, guidance to the elevator currently allocated to the destination call, departure floor, and/or state of the destination call.

In response to receiving, by the input means, input information comprising an instruction for cancelling the made destination call corresponding to the passenger ID, the controller entity may be configured to cancel the recorded destination call corresponding to the passenger ID.

Moreover, in response to receiving, by the input means, input information comprising an instruction for making a new destination call corresponding to the passenger ID, the controller entity may be configured to record the made new destination call corresponding to the passenger ID.

The destination call may be retrieved from the controller entity of the interface device or a computing entity.

The computing entity may be an elevator controller entity, the controller entity of the interface device, or any dedicated locally or remotely arranged device.

The at least one display may be implemented as a dynamic header element.

According to a second aspect, an elevator system is provided, wherein the elevator system comprising: at least one elevator, a computing entity, and at least one interface device described above.

According to a third aspect, a method for controlling displaying of a destination call is provided, wherein the method comprising: receiving, by input means, input information comprising a passenger ID; retrieving, by a controller entity, destination call corresponding to the passenger ID; and displaying, by at least one display, the retrieved destination call.

The method may further comprise: receiving, by the input means, input information comprising an instruction for cancelling the made destination call corresponding to the passenger ID; and cancelling, by the controller entity, the recorded destination call corresponding to the passenger ID.

Moreover, the method may further comprise: receiving, by the input means, input information comprising an instruction for making a new destination call corresponding to the passenger ID; and recording, by the controller entity, the made new destination call corresponding to the passenger ID.

The destination call may be displayed during a predetermined time.

The displayed destination call may comprise a destination floor.

Furthermore, the displayed destination call may further comprise an elevator ID of the elevator currently allocated to the destination call, guidance to the elevator currently allocated to the destination call, departure floor, and/or state of the destination call.

The expression “a number of” refers herein to any positive integer starting from one, e.g. to one, two, or three.

The expression “a plurality of” refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs “to comprise” and “to include” are used in this document as open limitations that neither exclude nor require the existence of unrecited features. The features recited in dependent claims are mutually freely combinable unless otherwise explicitly stated. Furthermore, it is to be understood that the use of “a” or “an”, i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
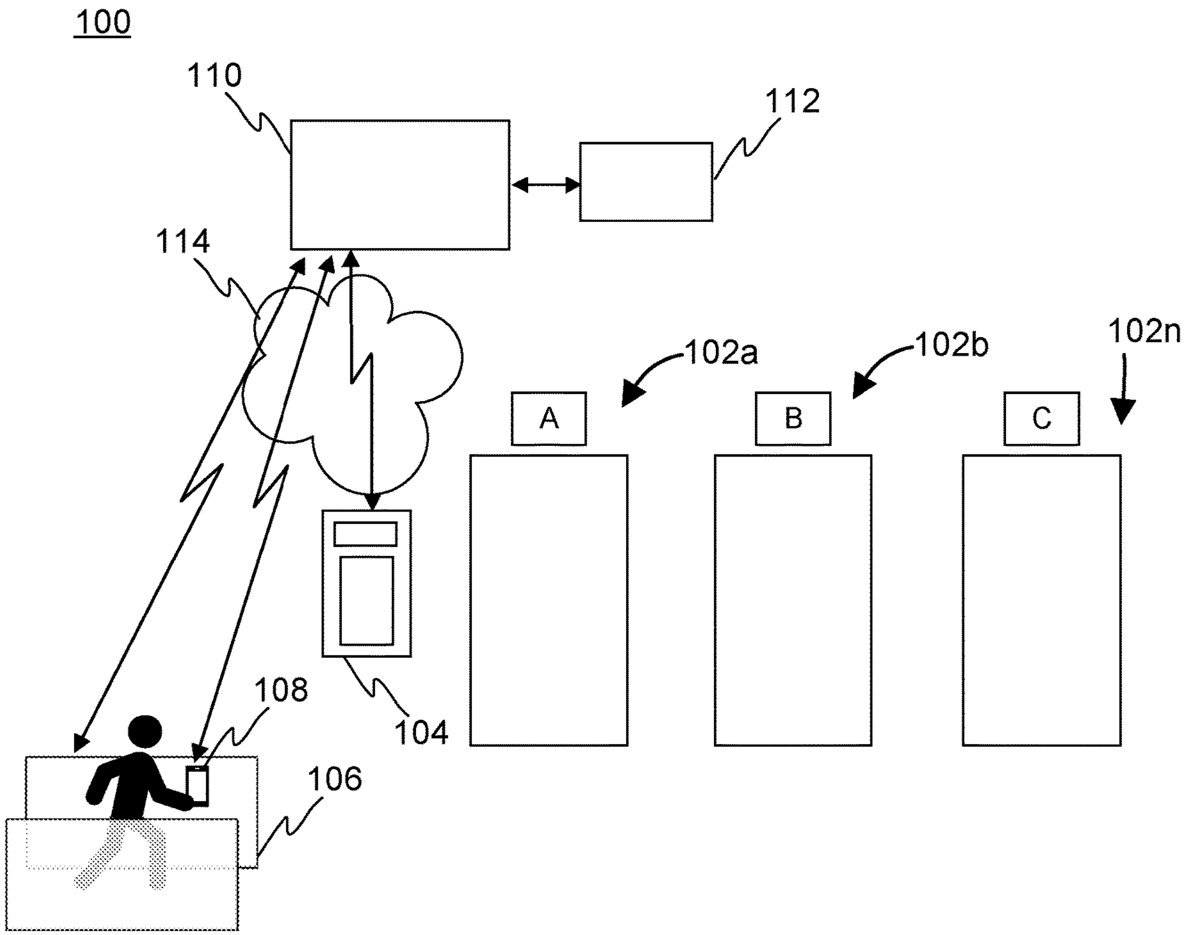
FIG. 1 illustrates schematically an example of an elevator system according to an embodiment of the invention.

FIG. 1 schematically illustrates an example of an elevator system 100 comprising one or more elevators 102*a*-102*n* residing in a location, e.g. in a building or in a ship (for sake of clarity the elevator shafts of the elevators are not shown in FIG. 1). The elevator system 100 comprises one or more interface devices 104, e.g. a destination operation panel (DOP), for providing a destination call to a desired destination floor, which may be predefined or manually chosen. The 15 one or more interface devices 104 may be located for example at an elevator lobby of each floor of the location in which the elevator system 100 is arranged. Each interface device 104 may comprise a user interface and a controller entity 206 for controlling at least partly the operation of the interface device 104. The user interface may comprise input means 202 and at least one display 204 for 20 interacting with at least one user, i.e. passenger. However, the present invention is not limited to destination calls made by the one or more interface devices 104, but the destination call to the desired destination floor may be provided with any other destination call device capable for making a destination call, such as a turnstile 106 or a mobile device 108.

The elevator system 100 further comprises an elevator controller entity 110 configured to control at least elevator entities 112 of the elevator system 100. For example, the elevator entities may comprise, but are not limited to, drive circuit and devices, safety circuit and devices, sensors, elevator door circuits and devices, elevator cabin and similar. The elevator entities 112 are at least communicatively coupled to each other either directly or indirectly e.g. through the elevator controller entity 110, which operates as a master device for the elevator 102*a*-102*n*.

The elevator controller entity 110 and the one or more interface devices 104 may be communicatively coupled to each other e.g. over a communication network 114. The communication network 114 may implement a wired or a wireless communication technology. The communication network 114 may e.g. be a mobile communication network or a local communication network. The elevator controller entity 110 comprises a communication interface, such a modem implementing the communication technology in use, towards the communication network 114. Similarly, the one or more interface devices 104 is configured accordingly to communicate through the communication network 114.

Figure 2:
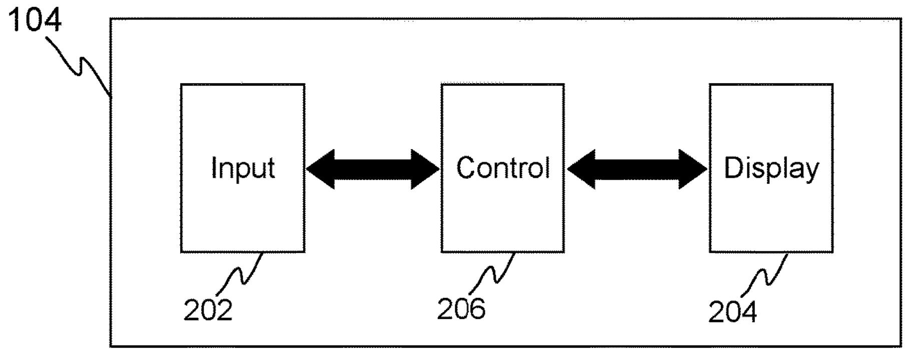
FIG. 2 schematically illustrates an example of entities of an interface device according to an embodiment of the invention.

FIG. 2 schematically illustrates an example of entities of the interface device 104, e.g. a DOP, according to an embodiment. As discussed above the interface device 104 may comprise input means 202, i.e. one or more input devices, at least one display 204, and a controller entity 206. The input means 202 may comprise at least one of the following: a card reader, RFID reader, NFC reader, QR code reader, a facial recognition camera, keypad, touch screen.

The input means 202 may interact with the at least one user, e.g. receive input information, through an access device 402, e.g. an access card, ID card, key card, mobile device, etc., comprising at least one of the following (respective to the input means of the interface device): RFID tag, NFC tag, QR code. Alternatively or in addition, the interaction with the at least one user may be provided so that the user press or touches the keypad and/or the touch screen in order to provide the input information. Alternatively or in addition, the interaction with the at least one user may be based on facial recognition and the facial recognition camera of the interface device 104 may be configured to provide image data, e.g. still or video, from the face of the passenger in order to provide input information for making a destination call, e.g, the face of the passenger may be used as a passenger ID. The controller entity 206 may be configured to perform facial recognition, i.e. process the received image data, e.g. by analyzing the received image data to identify the passenger.

Figure 4:
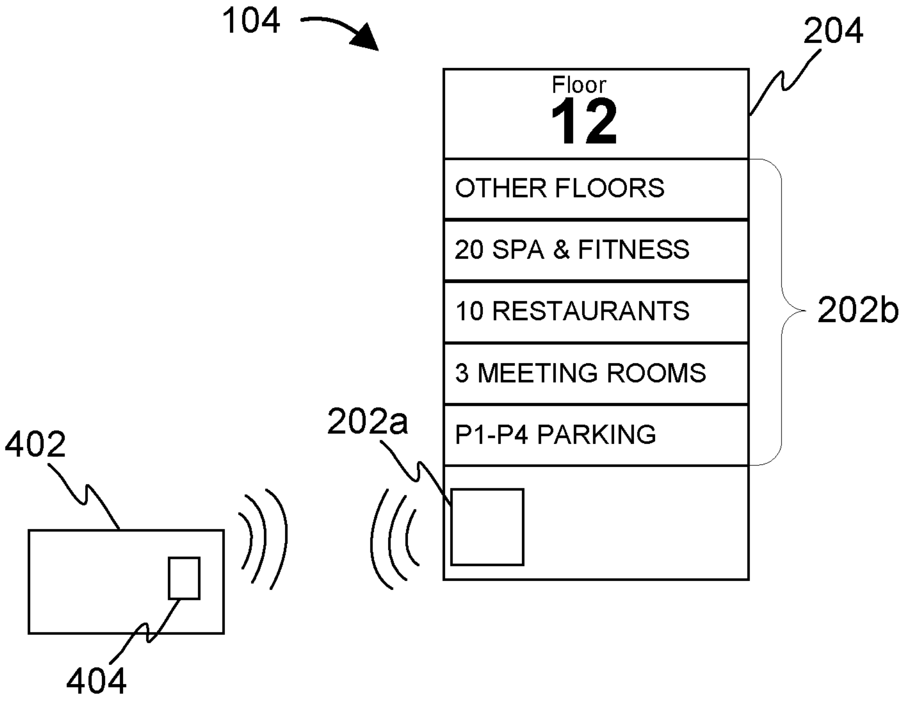
FIG. 4 illustrates an example of an interface device according to an embodiment of the invention.
Figure 6:
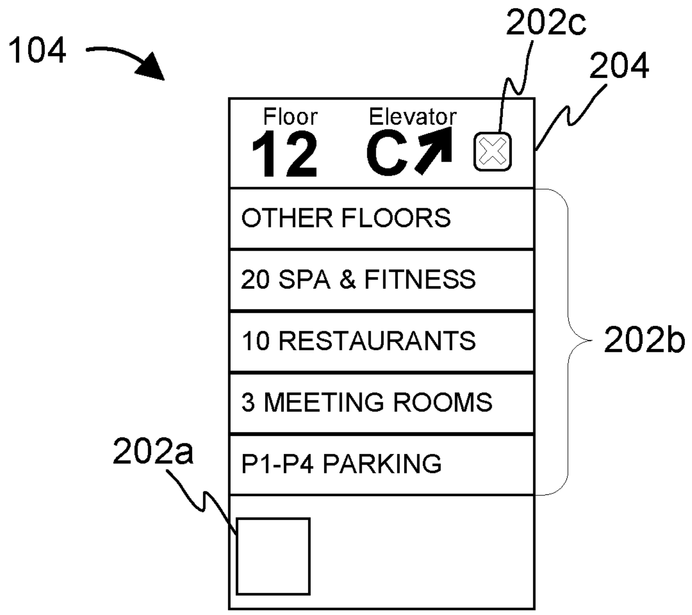
FIG. 6 illustrates another example of an interface device according to an embodiment of the invention.

The input means 202 may be implemented as an internal entity of the interface 104 as it is illustrated in FIGS. 4 and 6. Alternatively or in addition, the input means 202 may be implemented as an external entity of the interface device 104 communicatively coupled to the interface device 104, wherein the communicatively coupling may be based on one or more known communication technologies, either wired or wireless. In order to make a destination call the input means 202 of the interface device 104 receives input information comprising passenger ID for identifying the passenger, and/or destination floor.

The destination floor may be predefined, i.e. included in the received input information or stored to a computing entity that is configured to allocate an elevator to the made destination calls or stored to the controller entity 206 of the interface device 104. In case the destination floor is stored to the computing entity or to the controller entity 206 of the interface device 104, the received input information comprises the passenger ID to identify the passenger and for each passenger ID respective destination floor is prestored to the computing entity or to the controller entity 206. Alternatively or in addition, the destination floor may be manually chosen by the passenger via input means.

The at least one display 204 of the interface device 104 may be implemented as a dynamic header element. However, the at least one display 204 may be located anywhere of the interface device 104, preferably at the side facing to the passengers when the interface device 104 is arranged for example to an elevator lobby in the location. According to one embodiment the at least one display 204 and the input means 202 may be implemented as a common touch screen.

Figure 3:
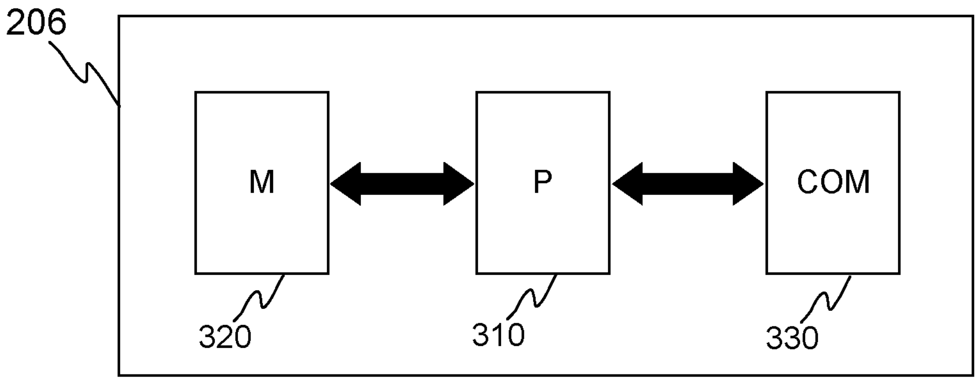
FIG. 3 illustrates an example of a controller entity of an interface device according to an embodiment of the invention.

FIG. 3 illustrates schematically an example of the controller entity 206 of the interface device 104 according to an embodiment of the invention. The controller entity 206 may comprise at least the following entities: processing unit 310 comprising one or more processors, memory unit 320 comprising one or more memories, and communication unit 330 comprising one or more communication devices, such as modems. In addition to the mentioned entities the controller entity 206 may comprise further devices and entities, such as batteries for storing energy to be used by the other entities. The entities of the controller entity 206 of the interface device 104 may be communicatively coupled to each other with e.g. a communication bus. The processing unit 310 may be configured to control the operation of interface device 104 by executing portions of computer program code stored e.g. in the memory unit 320. The memory unit 320 may also be used for storing retrieved and received information together with any other data either permanently or temporarily. Furthermore, the processing unit 310 may be configured to control communication with any external entity, such as with a computing entity, an elevator controller 110, one or more turnstiles 106, one or mobile devices 108, one or more other interface devices, or any other entities.

Moreover, the communication unit 330 may comprise a communication interface though which the interface device 104 may be communicatively coupled to the computing entity, such as an elevator controller entity 110, to another interface device and/or any other devices. The communication between the interface device 104 and the mentioned entities may e.g. be arranged through the communication network 114. Alternatively or in addition, the interface device 104 may be configured to communicate with at least one of the mentioned entities locally e.g. over a short range wireless communication technology. For example, the interface device 104 and the other entities may be coupled to a local Wi-Fi network and the communication may be arranged over it. According to still further embodiment a dedicated communication channel may be arranged between the interface device 104 and the other entities.

The interface device 104 may be mounted to a wall at the elevator lobby in the location in which the elevator system 100 is arranged. Alternatively, the interface device 104 may comprise a pedestal that may be arranged on a floor of the elevator lobby. The pedestal may be fixed to the floor or it may be movable.

FIG. 4 illustrates an example of the interface device 104 that comprises a reader 202*a*, e.g. RFID reader, NFC reader, or QR code reader, that may interact with an access card 402 that comprises a corresponding tag 404, e.g. RFID tag, NFC tag, or QR code, in order to receive input information for making a destination call. Alternatively or in addition, the interface device 104 may comprise any other type input means 202 as discussed above and correspondingly the access device 402 may be any other type of access device 402 as discussed above. The passenger may make a destination call by showing the access card 402 to the reader 202*a*. In the example illustrated in FIG. 4 the interface device 104 comprises further a touch screen 202*b* configured to receive input information for making a destination call. For example, the passenger may touch the touch screen on the area indicating one of the floors, such as floor 3 MEETING ROOMS, in order to make a destination call to said floor. In response to receiving the input information by the input means 202 the controller entity 204 of the interface device 104 is configured to record the made destination call, i.e. made destination call is stored into the memory unit 320 of the controller entity 204. Furthermore, the controller entity 206 may be configured to provide the input information to the computing entity for allocating an elevator to the made destination call. In case of a delayed destination call system (delayed DCS) an allocation of an elevator to the made destination call may be performed or postponed later or may be re-performed, re-optimized or updated later.

In the example illustrated in FIG. 4 the interface device 104 comprises further a display 204 for displaying the made destination call. The destination call displayed on the display 204 comprises at least the destination floor, i.e. floor 12, to which the destination call is made. The example illustrated in FIG. 4 illustrates only one non-limiting example of making a destination call.

Next some other non-limiting examples making destination calls are introduced. According to one example, the user may use a mobile device 108, e.g. mobile phone, tablet computer, to make the destination call. The mobile device 108 may comprise e.g. a mobile application through which the user may select the destination floor in order to make a destination call to said floor. The made destination call may be displayed on a display of the mobile device 108, wherein the destination call may comprise the destination floor and/or elevator ID of the elevator 102*a*-102*n* allocated to the destination call, which the user should take to get to the destination floor, if the elevator is allocated to the made destination call. The mobile device 108 may be communicatively coupled to a computing entity may e.g. over a communication network 114 for making the destination call. The communication network 114 may e.g. be a mobile communication network.

According to another example, the passenger may show an access device to the turnstile 106 communicatively coupled to a computing entity over a communication network 114 in order to provide a destination call to the desired destination floor. The turnstile 106 may be located for example at an elevator lobby or at a corridor in the vicinity of the elevator 102*a*-102*n* of the location, e.g. in a building or in a ship, wherein the elevator system 100 locates. The made destination call may be displayed on a display of the turnstile, wherein the displayed destination call may comprise the destination floor and/or elevator ID of the elevator 102*a*-102*n* allocated to the destination call, which the user should take to get to the destination floor, if the elevator is allocated to the made destination call.

According to yet another example, in case the access device 402 comprises a tag 404 for a short-range wireless communication, such as RFID tag, the passenger does not have to show the access device 402 to the interface device 104 and/or to the turnstile 106 in order to make the destination call, the passenger may just walk through the turnstile 106 or pass by the interface device 104 at such a distance that is within a read range, i.e, the distance from which a tag may be read, of the corresponding short-range wireless communication reader, such as RFID reader, of the interface device 104 to make the destination call.

The destination call made from any of the above discussed destination call devices may be provided to the computing entity that is configured to allocate an elevator to the made destination call. The destination call may be provided to the computing entity for example by generating a control signal to the computing entity for allocating an elevator to the made destination call. The allocation of an elevator may be performed immediately after receiving user information for making the destination call or the allocation of an elevator to the made destination call may be performed or postponed later. Alternatively or in addition, the allocation of an elevator may be re-performed, re-optimized or updated later, e.g. other elevator may be allocated to the destination call, if the other elevator is defined to be more propriate, e.g. quicker, more space, less stops on other floors, etc., to serve the passenger at the time when the passenger arrives to said elevator. The computing entity may further be configured to control the allocation information of the made destination calls. The controlling of the allocation information of the made destination calls may comprise for example storing of allocation information of the made destination calls, cancelling of the allocation of the made destination calls, sending the allocation information of the made destination calls to any other entity, etc. The destination call provided to the computing entity may comprise a destination floor, location of the destination call device, and/or a passenger ID. In response to allocation of the elevator to the made destination call, the computing entity is configured to send the allocation information of the destination call to the destination call device from which the destination call is made. The allocation information of the destination call may comprise the destination floor, the elevator ID of the elevator **102*a*-102*n* currently allocated to the destination call, and/or guidance to the elevator 102*a*-102*n* currently allocated to the destination call. Alternatively or in addition, the computing entity may be configured to send the allocation information of the destination call to another destination call device than the device from which the destination call is provided. For example, if the destination call is made from a mobile device 108, the computing entity may be configured to send the allocation information of the destination call to said mobile device 108 and/or to one or more interface devices 104 of the elevator system 100**.

In case an access control is required for the passenger to enter the desired destination floor, the computing entity may further be implemented as an access control entity and configured to identify the passenger by means of the passenger ID before allocating the destination call. The access control entity may be configured to store a plurality of passenger IDs that have access to one or more floors in the location. The identification of the user by means of the passenger ID may be provided so that the access control entity is configured to check whether the received passenger ID corresponds to one of the plurality of passenger IDs stored into the access control entity. In response to positive identification result, i.e, the access is approved, the computing entity is configured to allocate an elevator to the made destination call and possibly further provide an acknowledge signal to the destination call device indicating that the access is approved. Alternatively, in response to a negative identification result, i.e. the access is denied, the computing entity may be configured to provide an acknowledge signal to the destination call device indicating that the access is denied. The destination call device may then be configured to indicate the identification result to the user by means of one or more output means, such as one or more display, one or more light, a speaker etc.

The computing entity may be for example the elevator controller entity 110, the controller entity 206 of the interface device 104 or any dedicated locally or remotely arranged device, such as a server device, configured to perform the tasks of the computing entity. The implementation of the computing entity may be done as a stand-alone entity or as a distributed computing environment between a plurality of stand-alone devices, such as a plurality of servers providing distributed computing resource in the elevator system 100.

As discussed above after the passenger has made the destination call, the made destination call comprising the destination floor, the elevator ID of the elevator **102*a*-102*n* currently allocated to the destination call, and/or guidance to the elevator 102*a*-102*n* currently allocated to the destination call, may be displayed on a display of the destination call device in order to guide the passenger to the elevator 102*a*-102*n* allocated for the destination call made by said passenger. In case the destination call is made by the interface device 104 or by the turnstile 106 the made destination call may be displayed by the display 204 of the interface device 104 or the display of the turnstile 106** during a predetermined time, such as 2 to 5 seconds.

Figure 5:
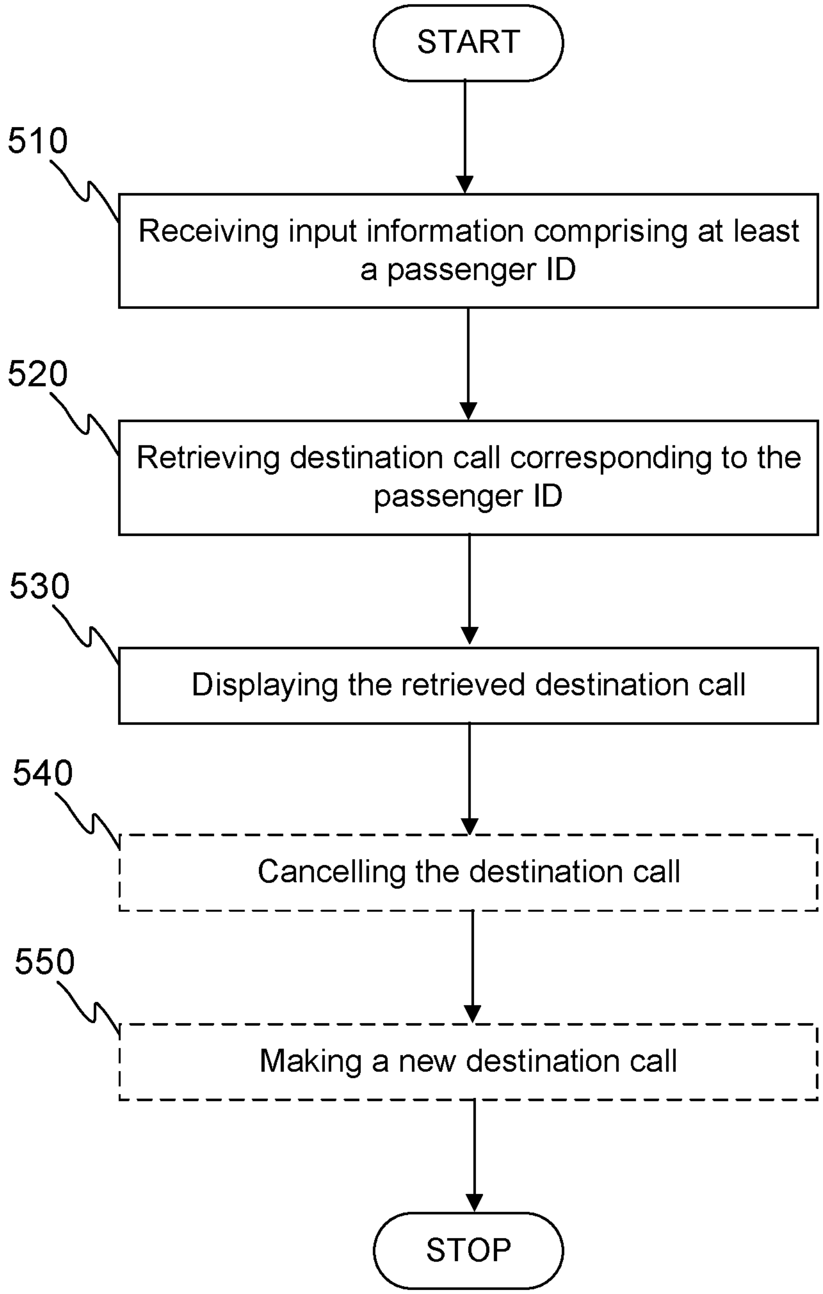
FIG. 5 illustrates an example of a method according to an embodiment of the invention.

FIG. 5 schematically illustrates an example of the method for controlling displaying of a destination call according to an embodiment of the invention. The method enables that the passenger may check the destination call made by said passenger previously. The destination call may have been made from any of the above destination call devices, e.g. interface device 104, turnstile, 106 mobile device 108, etc., and recorded to the destination call device and/or stored to the computing entity. In step 510 the input means 202 of the interface device 104 is configured to receive input information comprising at least a passenger ID. The input information may be received by several ways as discussed above. According to some non-limiting examples, the passenger may show an access device 402 to the input means 202 of the interface device 104 or the passenger may use the touch screen of the input means 202 of the interface device 104 to input the input information, etc.

In step 520 the controller entity 206 of the interface device 104 is configured to retrieve the destination call corresponding to the passenger ID of the received input information. The destination call may be retrieved from the computing entity where the destination calls are allocated and stored as discussed above. The stored destination call may comprise the destination floor, location of the destination call device, the passenger ID, elevator ID indicating the currently allocated elevator **102*a*-102*n* to the destination call, guidance to the allocated elevator 102*a*-102*n*, departure floor, and/or state of the destination call. The state of the destination call may be for example at least one of the following: active, allocated, served, cancelled, missed elevator, etc., Active state means that the made destination call is at least recorded, but not served or cancelled. Served state means that the elevator has conveyed the passenger from the departure floor to the destination floor. Cancelled state means that the destination call is cancelled e.g. by the passenger. The missed elevator state means that the passenger has not taken the allocated elevator for some reason. Alternatively or in addition, the destination call may be retrieved from the memory unit 320 of the controller entity 206 of the interface device 104** where the made destination calls are recorded. The recorded made destination call may comprise at least the destination floor.

In step 530 the at least one display 204 of the interface device 104 is configured to display the retrieved destination call. The displayed destination call may comprise at least the destination floor. The displayed destination call may further comprise at least one of the following if available: an elevator ID indicating the allocated elevator 102*a*-102*n* to the destination call, guidance to the allocated elevator 102*a*-102*n*, departure floor, and/or state of the destination call. The guidance to the allocated elevator may be for example an arrow pointing towards the allocated elevator 102*a*-102*n*.

According to one example, if an elevator is not yet allocated to the made destination call, the displayed destination call comprises only the destination floor. According to other example, if an elevator is allocated to the made destination call the displayed destination call may comprise the destination floor, an elevator ID indicating the allocated elevator 102*a*-102*n* to the destination call, guidance to the allocated elevator 102*a*-102*n*, departure floor, and/or state of the destination call.

According to one example, in case of the delayed DCS the allocation of the elevator to the destination call and/or displaying of the allocated elevator may be delayed and the displayed destination call comprises only the destination floor. This enables that the elevator may be allocated later, or the allocated elevator may be changed, if some other elevator turns out to be able to serve the passenger before the initially allocated elevator. For example, if there becomes a failure to the elevator allocated for the destination call, another elevator may be allocated for said destination call.

According to one example, if the state of the destination call is missed elevator, i.e, the passenger has not taken for some reason the allocated elevator, the displayed destination call may comprise the state of the destination call and the interface device 104 may further prompt the passenger to make a new destination call. The state of the destination call may be defined to be missed elevator for example in response to that the input means 202 receives input information comprising passenger ID corresponding to a made destination call that is served at that time or is going to be served within a short time. Alternatively or in addition, the state of the destination call may be defined to be missed elevator for example in response to a detection that no one entered into the allocated elevator during a predetermined time and/or before a need for the next movement of the elevator car of said elevator 102*a*-102*n*. The detection may be based on information obtained from a scale or a curtain of light of said elevator 102*a*-102*n*.

The at least one display 204 may be configured to display the destination call during a predetermined time, e.g. during 2 to 5 seconds. After that a new destination call may be made or another destination call may be rechecked as discussed above.

According to an embodiment, the input means 202 may be further configured to receive further input information comprising an instruction for cancelling the made destination call corresponding to the passenger ID (optional step 540 illustrated in FIG. 5). In response to receiving the cancelling instruction the controller entity 206 is configured to cancel the recorded made destination call corresponding to the passenger ID. In case an elevator is allocated to the destination call the controller entity 206 is further configured to provide the input information to the computing entity for cancelling the allocation of the elevator to the made destination call corresponding to the passenger ID. FIG. 6 illustrates schematically an example of the interface device 104 according to an embodiment of the invention, wherein the at least one display 204 and the input means 202 are implemented as common touch screen comprising an area indicating a button 202*c*, which the user may touch in order to provide input information comprising an instruction for cancelling the made destination call. The button 202*c* may be arranged in the vicinity of the made destination call, e.g. next to the made destination call as in the example illustrated in FIG. 6. However, the location of the button 202*c* in relation of the made destination call is not limited. In the example illustrate in FIG. 6 destination call displayed on the display 204 comprises the destination floor, i.e. floor 12, the currently allocated elevator 102*a*-102*n*, i.e. elevator C 102*n*, which the user should take to get to the destination floor, and a guidance to the elevator C 102*n*. The guidance may be for example an arrow pointing towards the allocated elevator 102*a*-102*n* as illustrated in FIG. 6.

In response to cancellation of the made destination, the input means 202 may be further configured to receive further input information comprising an instruction for making a new destination call corresponding to the received passenger ID instead of the cancelled destination call (optional step 550 illustrated in FIG. 5). In response to receiving the new destination call instruction the controller entity 206 is configured to record the made new destination call. In addition, the controller entity 206 may be configured to provide the input information to the computing entity for allocating an elevator to the new made destination call corresponding to the passenger ID. For example, the passenger may touch the touch screen on the area indicating one of the floors, for example in the example illustrated in FIG. 6 floor 10 RESTAURANTS, in order to make a destination call to said floor.

Figure 7:
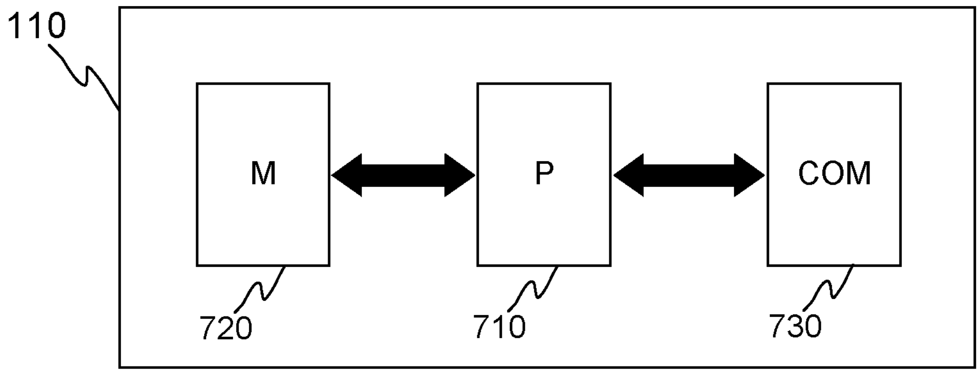
FIG. 7 illustrates an example of an elevator controller entity according to an embodiment of the invention.

FIG. 7 schematically illustrates an example of an elevator controller entity 110. The elevator controller may comprise a processing unit 710 comprising one or more processors, a memory unit 720 comprising one or more memories, and a communication unit 730 comprising one or more communication devices, such as modems or other devices. The elevator controller entity 110 is configured to control the operation of the elevator, e.g. allocation of the elevator, etc., and to communicate at least with one or more interface devices 104, and/or on or more elevator entities 112 of the elevator system 100. The memory unit 720 may store portions of computer program code and any other data, and the processing unit 710 may cause the elevator controller entity 110 to operate as described by executing at least some portions of the computer program code stored in the memory unit 720.

The above described invention enables that the passenger may recheck the destination call made for said passenger, which in turn at least partly decreases the number of unnecessary additional destination calls made by the same passenger. As a result, less unnecessary destination calls are made, and the flow of passengers may be optimized more efficiently. The present invention is advantageous, especially when there are no screens from which the passengers may see the made destination calls.

The term "destination call" refers throughout this application to a made destination call to which an elevator may or may not be allocated.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An interface device for controlling displaying of a destination call, the device comprising:

input means configured to receive input information comprising a passenger ID;

a controller entity, configured to retrieve the destination call corresponding to the passenger ID; and at least one display configured to display the retrieved destination call, wherein the interface device is a part of an elevator system's fixed or movable infrastructure within a building in which the elevator system is located, and the interface device is a destination operation panel, DOP permanently secured to a structure of an elevator lobby, and wherein the display is configured to show the retrieved destination call made that is publicly visible.

2. The interface device according to claim 1, wherein the input means comprises at least one of the following: a card reader, RFID reader, QR code reader, a facial recognition camera, keypad, touch screen.

3. The interface device according to claim 1, wherein the at least one display is configured to display the destination call during a predetermined time.

4. The interface device according to claim 1, wherein the displayed destination call comprises a destination floor.

5. The interface device according to claim 4, wherein the displayed destination call further comprises an elevator ID of an elevator currently allocated to the destination call, guidance to the elevator currently allocated to the destination call, departure floor, and/or state of the destination call.

6. The interface device according to claim 1, wherein in response to receiving, by the input means, input information comprising an instruction for cancelling a made destination call corresponding to the passenger ID, the controller entity is configured to cancel a recorded destination call corresponding to the passenger ID.

7. The interface device according to claim 6, wherein in response to receiving, by the input means, input information comprising an instruction for making a new destination call corresponding to the passenger ID, the controller entity is configured to record the made new destination call corresponding to the passenger ID.

8. The interface device according to claim 1, wherein the at least one display is implemented as a dynamic header element.

9. An elevator system comprising:

at least one elevator;

a computing entity; and at least one interface device according to claim 1.

10. The interface device according to claim 1, wherein the input means comprises at least one of the following: a card reader, RFID reader, QR code reader, a facial recognition camera, keypad, touch screen.

11. The interface device according to claim 1, wherein the at least one display is configured to display the destination call during a predetermined time.

12. The interface device according to claim 1, wherein the passenger ID is actively received at the interface device itself from an external source presented by a user to the input means.

13. The interface device according to claim 1, wherein the retrieved destination call comprises at least one of an allocated elevator ID and guidance including directional indications and instructions to an allocated elevator.

14. The interface device according to claim 1, wherein the controller entity is configured to retrieve a recorded destination call in an active state, and the at least one display is configured to display the retrieved destination call comprising an elevator ID of an elevator currently allocated to the destination call, a state of the destination call, and guidance to the elevator, wherein the active state indicates that the destination call is recorded but not yet served or canceled.

15. A method for controlling displaying of a destination call in an elevator system including an elevator, the method comprising:

receiving, by sensor-based input means of an elevator system interface device, input information comprising a passenger ID;

retrieving, by an elevator controller entity including a processor and a memory, destination call corresponding to the passenger ID; and displaying, by at least one display of the elevator system interface device, the retrieved destination call, wherein the elevator system interface device is a part of an elevator system's fixed or movable infrastructure within a building in which the elevator system is located, and the interface device is a destination operation panel, DOP permanently secured to a structure of an elevator lobby, and wherein the display is configured to show the retrieved destination call made that is publicly visible.

16. The method according to claim 15, further comprising:

receiving, by the input means, input information comprising an instruction for cancelling a made destination call corresponding to the passenger ID; and cancelling, by the controller entity, a recorded destination call corresponding to the passenger ID.

17. The method according to claim 16, further comprising:

receiving, by the input means, input information comprising an instruction for making a new destination call corresponding to the passenger ID; and recording, by the controller entity, the made new destination call corresponding to the passenger ID.

18. The method according to claim 15, wherein the destination call is displayed during a predetermined time.

19. The method according to claim 15, wherein the displayed destination call comprises a destination floor, and wherein the method further comprises the step of operating the elevator according to the retrieved destination call.

20. The method according to claim 19, wherein the displayed destination call further comprises an elevator ID of the elevator allocated to the destination call, guidance to the elevator allocated to the destination call, departure floor, and/or state of the destination call.

* * * * *